W. H. Gray. Hay Loader.

No. 106355

PATENTED AUG 16 1870

Witnesses:
E. Wolff
S. S. Mabee

Inventor:
W. H. Gray
per Munn & Co
Attorneys

United States Patent Office.

WILLIAM H. GRAY, OF ASHFIELD, MASSACHUSETTS.

Letters Patent No. 106,355, dated August 16, 1870.

IMPROVEMENT IN HAY-LOADERS.

The Schedule referred to in these Letters Patent and making part of the same

*To all whom it may concern:*

Be it known that I, WILLIAM H. GRAY, of Ashfield, in the county of Franklin and State of Massachusetts, have invented a new and useful Improvement in Hay-Loader; and I do hereby declare that the following is a full, clear, and exact description thereof, which will enable others skilled in the art to make and use the same, reference being had to the accompanying drawing forming part of this specification.

This invention relates to a new and useful improvement in machines for loading hay, whereby that laborious operation is performed by horse-power, and in the most expeditious manner; and It consists in cylinders, guides, and a revolving rake, arranged to operate as hereinafter described.

In the accompanying drawing—

Similar letters of reference indicate corresponding parts.

This machine is mounted on two wheels, A and B.

C is the axle.

On the axle, within each of the wheels, is a ratchet-wheel, with a spring pawl attached to the wheel, so arranged that the axle is revolved with the wheels when the machine is moving forward, and the wheels revolve on the axle when a backward movement takes place.

D is a gear-wheel on the axle, by means of which the cylinders, shafts, and rake are revolved.

E is the frame of the machine, in which the journals of the cylinders and shafts revolve.

F represents the tongue.

G is a front self-adjusting roller, which is attached to the apron guide H.

Figure 1:
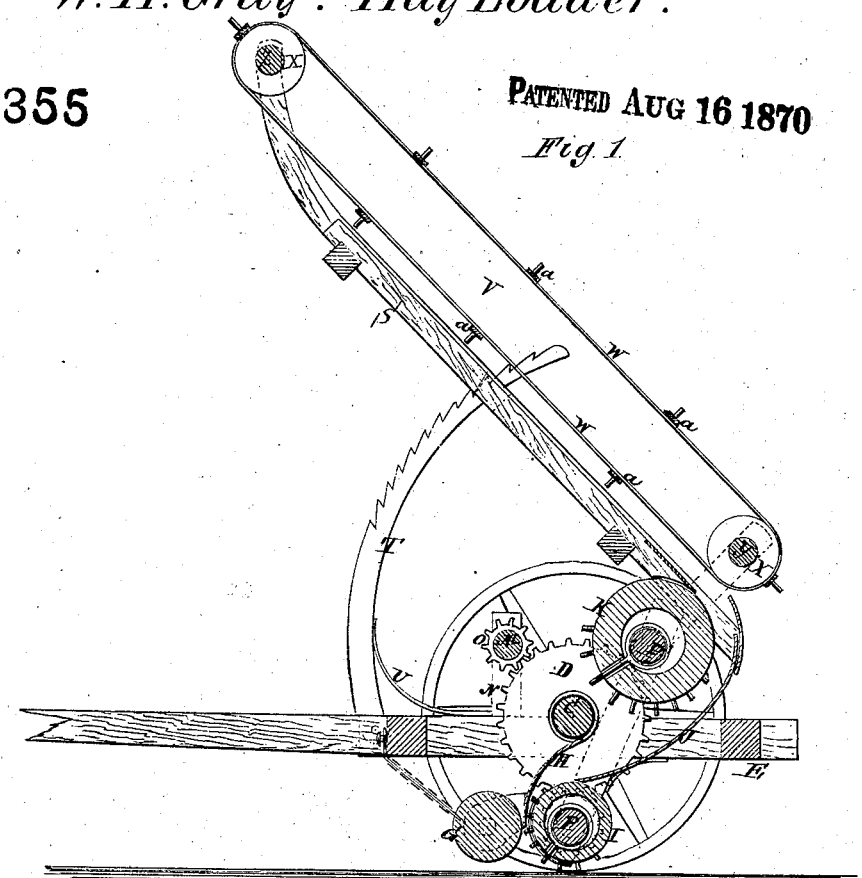
Figure 1 is a vertical section of the machine on the line *x–x* of fig. 2.
Figure 2:
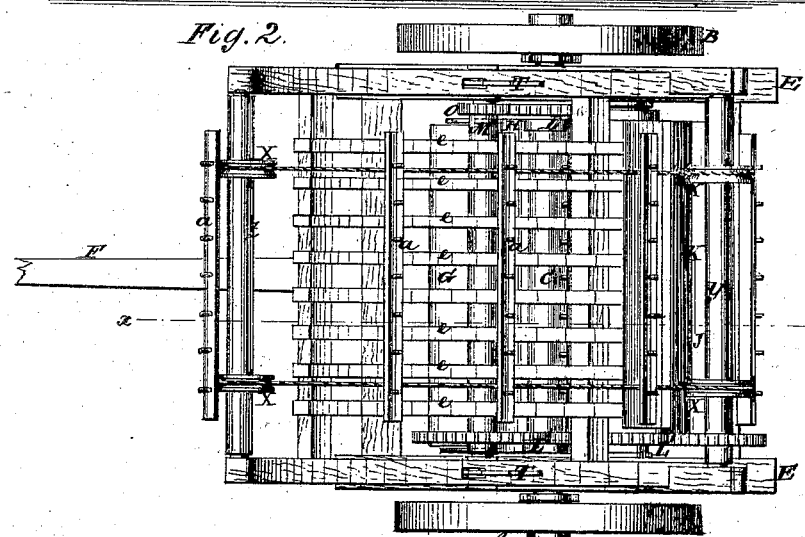
Figure 2 is a top or plan view.

This apron extends across the machine, and is connected to and supported by the axle, as seen in fig. 1.

The pivots of the roller G revolve in ears, on the guides H, as seen in dotted lines.

The wheels of the machine straddle the windrow of hay, and the roller G presses the hay down.

I is a toothed cylinder, located just in the rear of the roller G.

This cylinder raises the hay from the ground, and forces it upward on the guide-apron J, until it is reached by the teeth of the cylinder K.

This cylinder K is revolved by the gear-wheel L on the shaft M, which gear engages with the wheel L' on the end of the cylinder.

The shaft M is supported on the stands N, with a pinion-wheel, O, on its opposite end, by which it is driven from the gear-wheel D of the axle.

Both of the toothed cylinders I and K are hollow, and revolve on the ends of interior round bars, P P', whose ends are central with the cylinders, but whose interior portions are eccentrics, as seen in the drawing.

The teeth are made with bands or rings at their inner ends, which are slipped onto eccentrics, while their straight portions are made to enter holes in cylinders, so that, as they are carried around the eccentrics by the cylinders, they are made to protrude beyond the surface of the cylinders in one part of the revolution, and are drawn back beneath the surface in the other part.

By this arrangement, the surfaces of those cylinders are made to run close to the aprons J and R, the latter of which is connected with the slat floor of the elevator, onto which the hay is delivered by the cylinder K.

S is the elevator-frame, which is adjustably connected to the frame E by pivots, so that its opposite end may be elevated or depressed to suit the condition of the load on the hay-wagon.

The elevator is held in position by the ratchet-bars T, which are jointed to the frame E, and pass through mortises in the elevator frame, and are pressed outward by the springs U, so that the ratchet-teeth catch under the frame, and hold it in any desired position.

V is the revolving rake, formed of bands W, which pass over the pulley X, on the shafts Y Z.

The shaft Y is revolved by means of a gear-wheel, Z', which engages with the gear-wheel L', on the end of the cylinder K.

*a* are toothed cross-bars, which connect the bands W, the teeth of which catch the hay as it leaves the cylinder K, and force it upward on the slatted bottom of the elevator-frame.

*e* represents the slats.

This machine is attached by the tongue to the rear of the hay-wagon, and passes over the windrows, as before stated, taking the hay clean from the ground, and delivering it onto the wagon, the elevator being adjusted from time to time during the process of loading, to suit the height of the hay.

By this arrangement, the manual labor required is but slight, as the laborious operation of pitching hay is avoided, while the greatest expedition is secured.

Having thus described my invention,

I claim as new and desire to secure by Letters Patent—

1. An apron-guide, H, attached to the shaft C, and having roller G in ears thereon, arranged as and for the purpose described.

2. The combination of a self-adjusting roller, G, and apron H, with the toothed cylinder I, and toothed eccentric P, all relatively arranged as and for the purpose described.

3. The roller G, aprons H J, toothed cylinders I K, and toothed eccentrics P P', all combined and relatively arranged as and for the purpose described.

WILLIAM H. GRAY.

Witnesses:
SILAS BLAKE,
JOS. BLAKE.